United States Patent [19]
Clawson et al.

[11] Patent Number: 6,126,908
[45] Date of Patent: Oct. 3, 2000

[54] METHOD AND APPARATUS FOR CONVERTING HYDROCARBON FUEL INTO HYDROGEN GAS AND CARBON DIOXIDE

[75] Inventors: Lawrence G. Clawson, Dover; William L. Mitchell, Belmont; Jeffrey M. Bentley, Westford; Johannes H.J. Thijssen, Cambridge, all of Mass.

[73] Assignee: Arthur D. Little, Inc., Cambridge, Mass.

[21] Appl. No.: 08/703,398

[22] Filed: Aug. 26, 1996

[51] Int. Cl.[7] ................................. B01J 8/04; B01J 8/02
[52] U.S. Cl. ....................... 422/190; 422/193; 422/195; 422/198; 422/202; 422/211; 422/191; 429/19; 429/20; 48/61
[58] Field of Search ...................... 422/188–190, 422/193–195, 201–203, 211, 196, 197, 198; 429/17, 19–20; 423/456; 431/9; 48/61

[56] References Cited

U.S. PATENT DOCUMENTS

| | | |
|---|---|---|
| 1,797,426 | 3/1931 | Larson . |
| 3,334,971 | 8/1967 | James et al. . |
| 3,438,759 | 4/1969 | Linden et al. . |
| 3,499,797 | 3/1970 | Hooper . |
| 3,531,263 | 9/1970 | Sederquist ................................ 48/61 |
| 3,541,729 | 11/1970 | Dantowitz . |
| 3,615,217 | 10/1971 | O'Brien et al. . |
| 3,645,701 | 2/1972 | Banchik et al. ........................ 422/197 |
| 3,787,038 | 1/1974 | Tesner et al. ........................... 431/351 |

(List continued on next page.)

FOREIGN PATENT DOCUMENTS

| | | |
|---|---|---|
| 0 112 613 A2 | 7/1984 | European Pat. Off. . |
| 0 312 757 A1 | 4/1989 | European Pat. Off. . |
| 0 360 505 A2 | 3/1990 | European Pat. Off. . |
| 0 361 648 A1 | 4/1990 | European Pat. Off. . |
| 0 600 621 A1 | 6/1994 | European Pat. Off. . |
| 06 211 501 | 8/1994 | European Pat. Off. . |
| 4 060 166 | 1/1967 | United Kingdom . |
| 1 408 560 | 10/1975 | United Kingdom . |
| 2 084 894 | 4/1982 | United Kingdom . |
| 2 179 366 | 3/1987 | United Kingdom . |
| 2268322 | 1/1994 | United Kingdom . |

OTHER PUBLICATIONS

Houseman, J. et al., "On–Board Hydrogen Generator for a Partial Hydrogen Injection Internal Combustion Engine," Society of Automotive Engineers West Coast Meeting, Anaheim, California, Aug. 12–16, 1974.

Arthur D. Little, "On–Board Ethanol Fuel Processor: Integrated System Design," Feb. 15, 1995, Washington, D.C., U.S.A.

Arthur D. Little, "Development of an Ethanol Reformer for a Fuel Cell Bus," May 10, 1995, Des Moines, Iowa, U.S.A.

International Search Report mailed Mar. 13, 1998 for PCT Application No. PCT/US97/14906.

Ed M.V. Twigg, "Zinc Oxide" *Catalyst Handbook*, $2^{nd}$ ed., Sections 4.11.1 to 4.11.9 Wolfe Publishing 1989.

Catalytica Associates, Inc., "Overview of Fuel–Processing Technologies For Fuel–Cell Power Generation," Catalytica File No. 1036, Nov. 6, 1978.

*Primary Examiner*—Hien Tran
*Attorney, Agent, or Firm*—Wallenstein & Wagner, Ltd.

[57] ABSTRACT

An apparatus and a method are disclosed for converting hydrocarbon fuel or an alcohol into hydrogen gas and carbon dioxide. The apparatus includes a first vessel having a partial oxidation reaction zone and a separate steam reforming reaction zone that is distinct from the partial oxidation reaction zone. The first vessel has a first vessel inlet at the partial oxidation reaction zone and a first vessel outlet at the steam reforming zone. The reformer also includes a helical tube extending about the first vessel. The helical tube has a first end connected to an oxygen-containing source and a second end connected to the first vessel at the partial oxidation reaction zone. Oxygen gas from an oxygen-containing source can be directed through the helical tube to the first vessel. A second vessel having a second vessel inlet and second vessel outlet is annularly disposed about the first vessel. The helical tube is disposed between the first vessel and the second vessel and gases from the first vessel can be directed through second vessel.

25 Claims, 3 Drawing Sheets

U.S. PATENT DOCUMENTS

| | | | |
|---|---|---|---|
| 3,796,547 | 3/1974 | Muenger. | |
| 3,909,299 | 9/1975 | Corrigan. | |
| 3,920,416 | 11/1975 | Houseman. | |
| 3,955,941 | 5/1976 | Houseman et al.. | |
| 3,971,847 | 7/1976 | Houseman. | |
| 3,982,910 | 9/1976 | Houseman et al.. | |
| 4,059,076 | 11/1977 | Kosaka et al. | 123/3 |
| 4,125,090 | 11/1978 | Masunaga et al. | 123/3 |
| 4,233,180 | 11/1980 | Hausberger et al.. | |
| 4,236,899 | 12/1980 | Gulden et al. | 422/191 |
| 4,236,941 | 12/1980 | Main, Jr. | 148/235 |
| 4,257,920 | 3/1981 | Sugier et al.. | |
| 4,338,292 | 7/1982 | Duranleau. | |
| 4,365,006 | 12/1982 | Baker | 429/17 |
| 4,452,854 | 6/1984 | Merriam et al.. | |
| 4,504,447 | 3/1985 | Spurrier et al. | 422/204 |
| 4,522,894 | 6/1985 | Hwang et al. | 429/17 |
| 4,716,023 | 12/1987 | Christner et al. | 422/149 |
| 4,737,161 | 4/1988 | Szydlowski et al. | 48/61 |
| 4,781,241 | 11/1988 | Misage et al. | 165/140 |
| 4,789,384 | 12/1988 | Martens et al. | 48/197 R |
| 4,789,540 | 12/1988 | Jenkins | 423/648.1 |
| 4,822,521 | 4/1989 | Fuderer | 252/376 |
| 4,830,091 | 5/1989 | Dierke et al. | 165/134.1 |
| 4,836,831 | 6/1989 | Martens | 48/197 R |
| 4,838,020 | 6/1989 | Fujitsuka | 60/39.07 |
| 4,849,187 | 7/1989 | Uozu et al.. | |
| 4,861,347 | 8/1989 | Szydlowski et al. | 48/61 |
| 4,879,189 | 11/1989 | Snopkowski | 429/13 |
| 4,888,031 | 12/1989 | Martens | 48/197 R |
| 4,897,253 | 1/1990 | Jenkins | 423/651 |
| 4,904,455 | 2/1990 | Karafian et al. | 422/201 |
| 4,909,808 | 3/1990 | Voecks | 48/94 |
| 4,923,768 | 5/1990 | Kaneko et al. | 429/19 |
| 4,943,493 | 7/1990 | Vartanian | 429/17 |
| 4,988,580 | 1/1991 | Ohsaki et al. | 429/19 |
| 5,006,131 | 4/1991 | Karafian et al. | 422/201 |
| 5,019,463 | 5/1991 | Matsubara et al. | 429/12 |
| 5,026,536 | 6/1991 | Shioiri et al. | 423/652 |
| 5,030,440 | 7/1991 | Lywood et al. | 423/655 |
| 5,030,661 | 7/1991 | Lywood | 518/704 |
| 5,047,299 | 9/1991 | Shockling | 429/20 |
| 5,141,823 | 8/1992 | Wright et al. | 429/19 |
| 5,193,635 | 3/1993 | Mizuno et al. | 180/65.3 |
| 5,207,185 | 5/1993 | Greiner et al. | 123/3 |
| 5,221,586 | 6/1993 | Morimoto et al. | 429/20 |
| 5,246,791 | 9/1993 | Fisher et al.. | |
| 5,248,566 | 9/1993 | Kumar et al. | 429/19 |
| 5,248,567 | 9/1993 | Amemiya et al. | 429/20 |
| 5,260,640 | 11/1993 | Carabetta et al. | 322/2 R |
| 5,299,536 | 4/1994 | Moard et al. | 123/3 |
| 5,300,275 | 4/1994 | Lywood | 423/655 |
| 5,340,663 | 8/1994 | Buswell et al. | 429/17 |
| 5,344,721 | 9/1994 | Sonai et al. | 429/20 |
| 5,346,779 | 9/1994 | Nakazawa | 429/19 |
| 5,360,679 | 11/1994 | Buswell et al. | 429/19 |
| 5,437,123 | 8/1995 | Greiner et al. | 48/107 |
| 5,441,546 | 8/1995 | Moard et al. | 48/107 |
| 5,458,857 | 10/1995 | Collins et al. | 422/198 |
| 5,470,360 | 11/1995 | Sederquist | 48/94 |
| 5,486,313 | 1/1996 | DeJong et al. | 252/373 |
| 5,486,428 | 1/1996 | Gardner et al. | 429/19 |
| 5,527,632 | 6/1996 | Gardner | 429/27 |
| 5,529,484 | 6/1996 | Moard et al.. | |
| 5,546,701 | 8/1996 | Greiner et al. | 48/108 |
| 5,643,692 | 7/1997 | Ohmi. | |
| 5,645,950 | 7/1997 | Benz et al.. | |
| 5,648,182 | 7/1997 | Hara et al.. | |
| 5,651,800 | 7/1997 | Mizuno et al.. | |

METHOD AND APPARATUS FOR CONVERTING HYDROCARBON FUEL INTO HYDROGEN GAS AND CARBON DIOXIDE

GOVERNMENT RIGHTS

The Government has rights in this invention pursuant to Contract No. DE-AC02-92CE50343, awarded by the U.S. Department of Energy.

BACKGROUND OF THE INVENTION

Fuel cells continue to play an increasingly important role in power generation for both stationary and transportation applications. A primary advantage of fuel cells is their highly efficient operation which, unlike today's heat engines, are not limited by Carnot cycle efficiency. Furthermore, fuel cells far surpass any known energy conversion device in their purity of operation. Fuel cells are chemical power sources in which electrical power is generated in a chemical reaction between a reducer (hydrogen) and an oxidizer (oxygen) which are fed to the cells at a rate proportional to the power load. Therefore, fuel cells need both oxygen and a source of hydrogen to function.

There are two issues which are contributing to the limited use of hydrogen gas today. Firstly, hydrogen gas ($H_2$) has a low volumetric energy density compared to conventional hydrocarbons, meaning that an equivalent amount of energy stored as hydrogen will take up more volume than the same amount of energy stored as a conventional hydrocarbon. Secondly, there is presently no widespread hydrogen infrastructure which could support a large number of fuel cell power systems.

An attractive source of hydrogen to power fuel cells is contained in the molecular structure of various hydrocarbon and alcohol fuels. A reformer is a device that breaks down the molecules of a primary fuel to produce a hydrogen-rich gas stream capable of powering a fuel cell. Although the process for reforming hydrocarbon and alcohol fuels is established on a large industrial basis, no known analogous development has occurred for small-scale, highly integrated units.

Therefore, a need exists for a more compact apparatus for generating hydrogen gas from a variety of hydrocarbon fuel sources for use in a fuel cell to power a vehicle.

SUMMARY OF THE INVENTION

The present invention relates to a reformer and method for converting an alcohol or hydrocarbon fuel into hydrogen gas and carbon dioxide.

The reformer includes a first vessel having a partial oxidation reaction zone and a separate steam reforming reaction zone that is distinct from the partial oxidation reaction zone. The first vessel has a first vessel inlet at the partial oxidation reaction zone and a first vessel outlet at the steam reforming zone. The reformer also includes a helical tube extending about the first vessel. The helical tube has a first end connected to an oxygen-containing source and a second end connected to the first vessel at the partial oxidation reaction zone. Oxygen gas from an oxygen-containing source can be directed through the helical tube to the first vessel. A second vessel having a second vessel inlet and second vessel outlet is annularly disposed about the first vessel. The helical tube is disposed between the first vessel and the second vessel and gases from the first vessel can be directed through the second vessel.

The method includes directing oxygen-containing gas through a helical tube which is disposed around a first vessel. Hydrocarbon vapor and steam are directed into the helical tube to form a mixture of oxygen gas, fuel vapor and steam. The mixture of oxygen gas, fuel vapor and steam are directed into the first vessel. The fuel vapor spontaneously partially oxidizes to form a heated reformate stream that includes carbon monoxide and hydrogen gas. The remaining fuel vapor is steam reformed in the heated reformate stream to form hydrogen gas and carbon monoxide. The heated reformate stream is directed over the exterior of the helical tube, whereby the heated reformate stream heats the mixture in the helical tube. A portion of the carbon monoxide gas of the reformate stream is converted to carbon dioxide and hydrogen gas by a high temperature shift reaction. At least a portion of the remaining carbon monoxide gas of the reformate stream is converted to carbon dioxide and hydrogen gas by a low temperature shift reaction.

In another embodiment of a reformer for converting a hydrocarbon fuel into hydrogen gas and carbon dioxide, the apparatus includes a first tube which has a first tube inlet for receiving a first mixture of an oxygen-containing gas and a first fuel, which can be a hydrocarbon or an alcohol, and a first tube outlet for conducting a first reaction reformate of the first mixture. A second tube is annularly disposed about the first tube, wherein the second tube has a second tube inlet for receiving a second mixture of a second fuel, which can be a hydrocarbon or an alcohol, and steam. A second tube has a second tube outlet for conducting a second reaction reformate of the second mixture. A catalyst reforming zone is annularly disposed about the second tube. The first reaction reformate and the second reaction reformate can be directed through the first tube outlet and the second tube outlet, respectively, to the catalyst reforming zone for further reforming of the mixtures. In a preferred embodiment, a hydrocarbon fuel fractionator is attached at the first tube inlet and second tube inlet. The fractionator can separate a heavy portion from the hydrocarbon fuel for subsequent direction to the partial oxidation zone in the first tube. A light portion can be separated from the hydrocarbon fuel for subsequent direction to the steam reforming zone in the second tube.

In another embodiment of the method for converting a hydrocarbon or alcohol fuel into hydrogen gas and carbon dioxide, a first mixture of first hydrocarbon or alcohol fuel and oxygen-containing gas is directed into a first tube. The hydrocarbon or alcohol fuel in the first mixture spontaneously partially oxidizes to form a first heated reformate stream that includes hydrogen gas and carbon monoxide. A second mixture of a second hydrocarbon or alcohol fuel and steam is directed into a second tube annularly disposed about the first tube. The second hydrocarbon or alcohol fuel of the second mixture partially steam reforms to form a second heated reformate stream that includes hydrogen gas and carbon monoxide. The first heated reformate stream and second heated reformate stream are directed through a catalyst reforming zone to further reform the reformate streams to hydrogen gas and carbon dioxide. In a preferred embodiment, the hydrocarbon fuel prior to direction into the first tube and the second tube is fractionated into heavy portion of the hydrocarbon fuel and a light portion of the hydrocarbon fuel. The heavy portion is subsequently directed to the partial oxidation zone. The light portion is directed to the steam reforming zone.

This invention has many advantages. The apparatus can use a variety of hydrocarbon fuels, such as gasoline, JP-8, methanol and ethanol. The partial oxidation reaction zone allows the fuel to partially burn while not forming soot and while providing heat to the steam reforming zone and the other portions of the reactor annularly disposed around the partial oxidation zone. Further, the apparatus is sufficiently compact for use in an automobile. In some embodiments, the apparatus includes a high temperature shift catalyst which allows the apparatus to be more compact and lighter in weight than if only a low temperature shift catalyst is used.

DETAILED DESCRIPTION OF THE INVENTION

The features and details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

Figure 1:
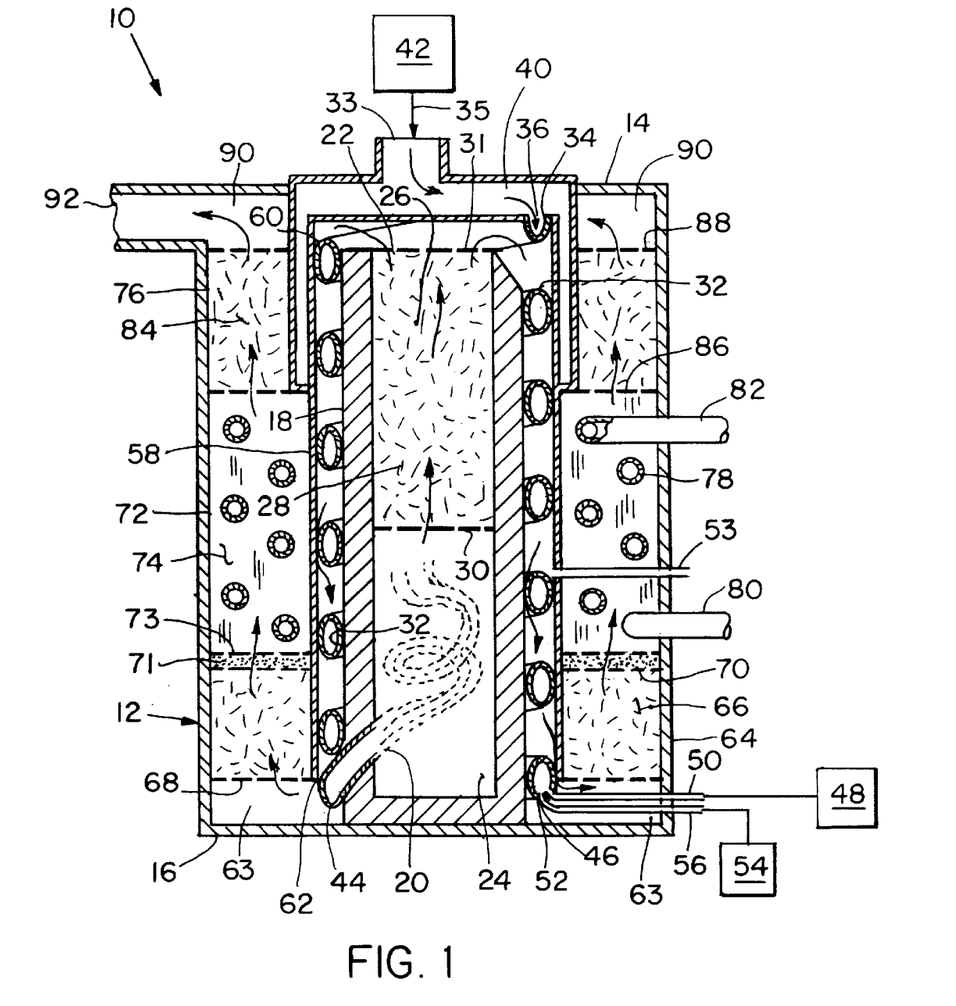
FIG. 1 is an orthogonal projection side view of one embodiment of the apparatus of the present invention.

One embodiment of the invention is shown in FIG. 1. Reformer 10 has reformer vessel 12. Reformer vessel 12 can be cylindrical in shape. Reformer 10 has upper portion 14 and lower portion 16. Disposed in the center of reformer vessel 12 is first vessel 18 which extends substantially the height of reformer vessel 12. First vessel 18 has first vessel inlet 20 for receiving gases into first vessel 18 and can tangentially direct the gases through the first vessel. First vessel 18 has first vessel outlet 22 at upper portion 14 of reformer 10 for gases to exit first vessel. Perforated plate 31 is located at first vessel outlet 22 and covers the diameter of first vessel 18. Partial oxidation reaction zone 24 is in lower portion 16 of first vessel 18.

Partial oxidation zone 24 is suitable for partial oxidation of a hydrocarbon or alcohol fuel with oxygen to form a mixture including carbon monoxide, steam and hydrogen gas. Steam reforming zone 26 is above partial oxidation zone 24 and includes a steam reforming catalyst 28. Preferably, the steam reforming catalyst includes nickel with amounts of a noble metal, such as cobalt, platinum, palladium, rhodium, ruthenium, iridium, and a support such as magnesia, magnesium aluminate, alumina, silica, zirconia, singly or in combination. Alternatively, steam reforming catalyst 28 can be a single metal, such as nickel, supported on a refractory carrier like magnesia, magnesium aluminate, alumina, silica, or zirconia, singly or in combination, promoted by an alkali metal like potassium. Steam reforming zone 26 can autothermally reform steam and methane generated in partial oxidation zone 24 to hydrogen gas and carbon monoxide. Steam reforming catalyst 28, which can be granular, is supported within partial oxidation zone 24 by perforated plate 30 and perforated plate 31.

Helical tube 32 extends about the length of first vessel 18. First end 34 of helical tube 32 is located at inlet housing 33. Oxygen source 42 is connected to inlet housing 33 by conduit 35 with first end inlet 36 for receiving oxygen-containing gas from oxygen gas zone 40. Second end 44 of helical tube 32 is connected at first vessel inlet 20. Examples of suitable oxygen-containing gas include oxygen (02), air, etc. Fuel inlet 46 is joined to helical tube 32 proximate to second end 44. Conduit 50 extends from fuel source 48 to fuel inlet 46. Examples of suitable fuels include hydrocarbons which encompass alcohols, also. Fuels include gasoline, kerosene, JP-8, methane, methanol and ethanol. Steam inlet 52 is proximate to fuel inlet 46. Steam can be directed from steam source 54 to steam tube 56 through first steam inlet 52 into helical tube 32. In another embodiment, fuel and steam can be directed into helical tube 32.

Second vessel 58 is annularly disposed about first vessel 18. Second vessel inlet 60 receives gaseous products from first vessel outlet 22. Second vessel outlet 62 at lower portion 16 of reformer 10 allows gas to exit second vessel 58. Helical tube 32 is disposed between first vessel 18 and second vessel 58 and gases from first vessel 18 can be directed through second vessel 58 from second vessel inlet 60 over and around helical tube 32 to second vessel outlet 62. Flow distribution region 63 conducts gas from second vessel outlet 62 to high temperature shift zone 64. Additional steam or water can be directed from a steam source into second vessel 58 through second steam inlet 53 to provide added steam to provide added cooling and further the reformation of the fuels.

High temperature shift zone 64 is annularly located between second vessel 58 and reformer vessel 12 and includes a high temperature shift catalyst. An example of a suitable high temperature shift catalyst are those that are operable at a temperature in the range of between about 300° C. and about 600° C. Preferably the high temperature shift catalyst includes transition metal oxides, such as ferric oxide ($Fe_2O_3$) and chromic oxide ($Cr_2O_3$). Other types of high temperature shift catalysts include iron oxide and chromium oxide promoted with copper, iron silicide, supported platinum, supported palladium, and other supported platinum group metals, singly and in combination. High temperature shift catalyst 66 is held in place by perforated plate 68 and perforated plate 70. Gas can pass through high temperature shift zone 64 through perforated plate 70 to sulfur removal zone 71.

Above high temperature shift zone 64 is sulfur removal zone 71. Sulfur removal zone 71 includes a catalyst which can reduce the amount of hydrogen sulfide ($H_2S$), which is deleterious to a low temperature shift catalyst, in the gas stream to a concentration of about one part per million or less. An example of a suitable catalyst includes a zinc oxide. Sulfur removal zone 71 is sized depending on the type of fuel used. If a low sulfur fuel is used, a small sulfur removal zone is needed. If a high sulfur fuel is used, a larger sulfur removal zone is necessary. Gas can pass from sulfur removal zone 71 through perforated plate 73 to cooling zone 72.

Cooling zone 72 includes a plurality of vertical fins 74 which radiate from second vessel 58 to reformer vessel 12 which extends from high temperature shift zone 64 to low temperature shift zone 76.

Cooling tube 78 is helically disposed about second vessel 58 and is attached to vertical fins 74. Cooling tube 78 has cooling tube inlet 80 for receiving a cooling medium, such as water, through cooling tube 78 to cooling tube outlet 82. In another embodiment, cooling tube 78 is wound a second series of times around second vessel 58. The gaseous products from high temperature catalyst zone 64 can pass between the vertical fins 74 and pass over cooling tube 78 allowing gaseous products to cool.

Low temperature shift zone 76 is annularly disposed above cooling zone 72 and between second vessel 58 and reformer vessel 12 and includes low temperature shift modifying catalyst 84 for reducing carbon monoxide to a level of less than about one percent, by volume, or below. An example of a suitable low temperature modifying catalyst are those that are operable at a temperature in a range of between about 150° C. and about 300° C. Preferably, the low temperature modifying catalyst includes cupric oxide (CuO) and zinc oxide (ZnO). Other types of low temperature shift catalysts include copper supported on other transition metal oxides like zirconia, zinc supported on transition metal oxides or refractory supports like silica or alumina, supported platinum, supported rhenium, supported palladium, supported rhodium and supported gold. Low temperature shift zone catalyst 84 is held in place by lower perforated plate 86 and upper perforated plate 88. Gaseous products from cooling zone 72 can pass through perforated plate 86 through low temperature shift zone 76 through upper perforated plate 88. Exit zone 90 is above low temperature shift zone 76 and has reformer exit 92.

In the method for converting hydrocarbon fuel into hydrogen gas, an oxygen-containing gas, such as air, is directed from oxygen source 42 through conduit 35 to inlet housing 33 to oxygen gas zone 40 into first end inlet 36 of helical tube 32. Reformer 10 can operate at a pressure in the range of between about 0 and 500 psig. The oxygen-containing gas, such as air, is preheated to a temperature of about 450° C. In a preferred embodiment, air has a velocity of greater than about 40 meters per second.

A suitable hydrocarbon or alcohol vapor is directed from fuel source 48 through fuel tube 50 to fuel inlet 46. Examples of suitable hydrocarbon fuels include gasoline, JP-8, methanol, ethanol, kerosene and other suitable hydrocarbons typically used in reformers. Gaseous hydrocarbons, such as methane or propane, can also be used. Steam is directed from steam source 54 through steam tube 56 to first steam inlet 52. Steam has a temperature in the range between about 100 and about 150° C. The air, steam and hydrocarbon fuel are fed at rates sufficient to mix within helical tube 32 and spontaneously partially oxidize as the mixture enters partial oxidation zone 24 through first vessel inlet 20 to form a heated reformate stream that includes carbon monoxide and hydrogen gas. In a preferred embodiment, oxygen-containing gas is tangentially directed around the interior of partial oxidation zone 24, which is an empty chamber. In partial oxidation zone 24, the reformate products can include methane, hydrogen gas, water and carbon monoxide. Partial oxidation zone 24 has a preferred temperature in the range of between about 950° C. and about 1150° C. A heavier fuel is preferentially run at the higher end of the temperature range while a lighter fuel is run at a lower end of the temperature range.

From partial oxidation zone 24, reformate products are directed through perforated plate 30 to steam reforming zone 26. In steam reforming zone 26, the remaining hydrocarbon vapor in the heated reformate stream from partial oxidation zone 24 is steam reformed in the presence of steam reforming catalyst 28 into hydrogen gas and carbon monoxide. Steam reforming zone 26 typically has a temperature in the range of between about 700 and 900° C. The partial oxidation reaction provides sufficient heat to provide heat to helical tube 32 to preheat the air and other contents of helical tube 32 and also provide heat to the steam reforming step. The hydrocarbon fuel is burned partly in partial oxidation zone 24 and the remainder of the fuel with the steam is mixed with the partial oxidation zone combustion products for steam reforming and hydrocarbon shifting to carbon monoxide and hydrogen gas in the presence of steam reforming catalyst 28. The heated reformate stream exiting from steam reforming zone 26 has a temperature of between about 700° C. and about 900° C. The heated reformate stream is directed between first vessel 18 and second vessel 58 and around the exterior of helical tube 32, whereby the heated reformate stream is cooled by heating the contents of helical tube 32 and also the first vessel 18 and second vessel 56.

Heated reformate stream exits second vessel outlet 62 to flow distribution zone 63, where it has been cooled to a temperature of between about 300° C. and about 600° C. and is directed through perforated plate 68 to high temperature shift zone 64 where essentially all of the carbon monoxide is removed or reduced by contacting the heated reformate stream with high temperature shift catalyst 66 at a temperature in the range of between about 300° C. and 600° C. High-temperature shift zone 64 operates adiabatically to reduce the carbon monoxide levels with modest temperature rise. In one embodiment, heated reformate stream entering high temperature shift zone 64 has about fourteen to seventeen percent carbon monoxide, by volume, and exits high temperature shift zone 64 with about two to four percent carbon monoxide, by volume.

The high temperature shift zone treated reformate stream is directed through sulfur removal zone 71 where the hydrogen sulfide content of the stream is reduced to a concentration of less than about one part per million. From sulfur removal zone 71, the reformate is directed to cooling zone 72 where the stream contacts the vertical fins 74 and cooling tubes 78 to lower the temperature of the stream to between about 150° C. and about 300° C. because low temperature shift catalyst 84 is temperature sensitive and could possibly sinter at a temperature of above about 300° C. Cooling zone 72 cools high temperature reformate gas for low temperature shift zone 76. Cooling zone tubes 78 operate continuously flooded to allow accurate and maximum steam side heat transfer, to reduce fouling and corrosion to allow use of contaminated water, and to achieve a constant wall minimum temperature.

Reformate stream is directed through perforated plate 86 to low temperature shift reaction zone 76 where the reformate stream contacts low temperature shift catalyst 84 converting at least a portion of the remaining carbon monoxide gas of the reformate stream to carbon dioxide by low temperature shift reaction to form product stream. Low temperature shift reaction zone 76 operates adiabatically to reduce the remainder of the carbon monoxide to trace levels with modest catalyst temperature rise. The resulting gas product stream exits low temperature shift reaction zone 76 through perforated plate 88 to exit gas zone 90 to reformer exit 92. The exiting product stream can have a composition of about 40% hydrogen gas and less than one percent carbon monoxide on a wet volume basis.

Figure 2:
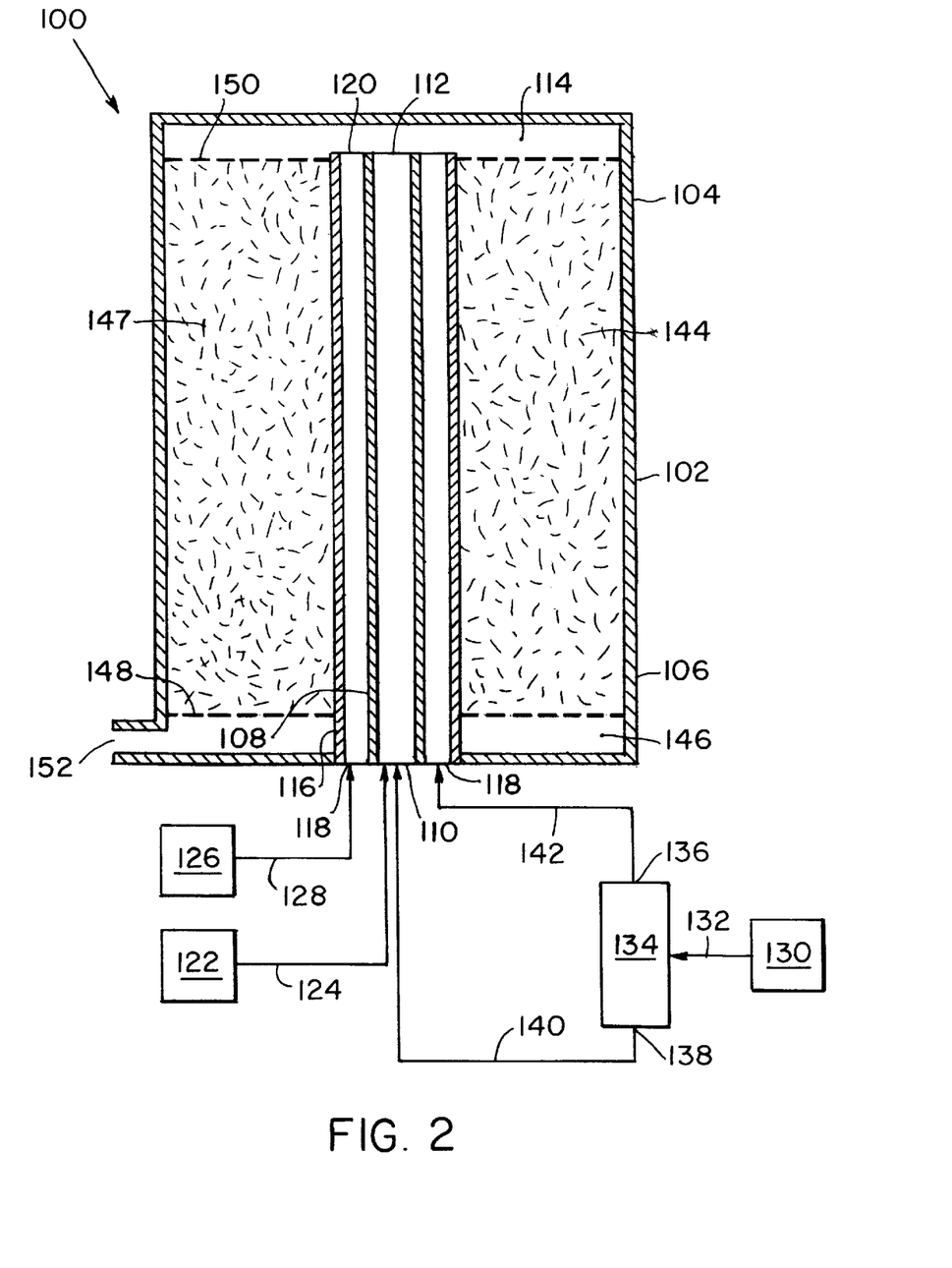
FIG. 2 is an orthogonal projection side view of a second embodiment of the apparatus of the present invention.

A second embodiment of the invention is shown in FIG. 2. Second reformer loo has reformer shell 102. Reformer shell 102 has upper portion 104 and lower portion 106. Disposed in the center of reformer shell 102 is first tube 108 which extends substantially the height of reformer shell 102. First tube 108 has a first tube inlet 110 at lower portion 106 for receiving gases into first tube 108. First tube 108 is configured for receiving a first mixture of oxygen and first hydrocarbon fuel. First tube outlet 112 is configured for directing a first reaction reformate of the first mixture to mixing zone 114.

Second tube 116 is annularly disposed about first tube 108. Second tube 116 has second tube inlet 118 for receiving second hydrocarbon fuel and steam. Second tube 116 also has second tube outlet 120 for directing a second reaction reformate of a second mixture. Second tube 116 can include a steam reforming catalyst. An example of a suitable catalyst includes nickel with amounts of a noble metal such as cobalt, platinum, palladium, rhodium, ruthenium, iridium, and a support such as magnesia, magnesium aluminate, alumina, silica, zirconia, singly or in combination. Alternatively, steam reforming catalyst can be a single metal, such as nickel, supported on a refractory carrier like magnesia, magnesium aluminate, alumina, silica, or zirconia, singly or in combination, promoted by an alkali metal like potassium. In another embodiment, second tube 116 can be annularly disposed within first tube 108, wherein steam and fuel can be directed into the center tube and fuel and oxygen can be directed into the tube annularly disposed around the center tube.

Oxygen source 122 is connected by oxygen tube 124 to first tube 108. An example of a suitable oxygen source is oxygen gas or air. Steam source 126 is connected to second tube 116 by steam tube 128. In one embodiment, steam source 126 can provide a source of steam at a temperature of about 150° C. and a pressure of about 60 psia.

Fuel source 130 is connected by fuel tube 132 to fractionator 134. Fuel source 130 includes a suitable fuel, such as a hydrocarbon, including gasoline, JP-8, kerosene, also alcohol including methanol and ethanol. Fractionator 134 has light portion outlet 136 for directing light portion from fractionator 134 and heavy portion outlet 138 for directing heavy portion from fractionator 134. Heavy portion can be directed from heavy portion outlet 138 through heavy portion tube 140 to first tube inlet 110. Light portion can be directed from light portion outlet 138 through light portion tube 142 to second tube inlet 118. In another embodiment, separate sources can be used for heavy portion (first hydrocarbon fuel) and light portion (second hydrocarbon fuel) without having a fractionator.

Catalyst reforming zone 144 is annularly disposed about second tube 116. First reaction reformate and second reaction reformate can be directed through first tube outlet 112 and second tube outlet 120, respectively, to mixing zone 114 above catalyst reforming zone 144.

Catalyst reforming zone 144 includes a catalyst for further reforming of the mixtures to hydrogen gas. An example of a suitable catalyst includes nickel with amounts of a noble metal such as cobalt, platinum, palladium, rhodium, ruthenium, iridium, and a support such as magnesia, magnesium aluminate, alumina, silica, zirconia, singly or in combination. Alternatively, the catalyst can be a single metal, such as nickel, supported on a refractory carrier like magnesia, magnesium aluminate, alumina, silica, or zirconia, singly or in combination, promoted by an alkali metal like potassium. Catalyst reforming zone 144 can have a height that is substantially the length of first tube 108 and second tube 116. Catalyst reforming zone 144 is sufficiently porous to allow passage of gas from exit zone 146. Catalyst 147 in catalyst reforming zone 144 is held in place by lower perforated plate 148 and upper perforated plate 150. Product gases of catalyst reforming zone 144 can exit second reformer 100 from exit zone 146 through reformer shell exit 152.

In the second embodiment of the invention for converting hydrocarbon fuel into hydrogen gas and carbon dioxide, a fuel is directed from fuel source 130 to fractionator through fuel tube 132. The fuel is separated into a light portion and a heavy portion in fractionator 134. The heavy portion is directed from heavy portion outlet 138 through heavy portion tube 140 to first tube inlet 110. An oxygen-containing gas, such as air, is directed from oxygen source 122 through oxygen tube 124 to first tube inlet 110. The oxygen-containing gas and the heavy portion of the hydrocarbon fuel form a mixture in first tube, whereby the hydrocarbon fuel of the first mixture spontaneously partially oxidizes to form a first heated reformate stream that includes hydrogen gas and carbon monoxide. First heated reformate stream can be heated to about 1,525° C. The ratio of fuel to oxygen is adjusted depending upon the type of fuel used. A heavier fuel can require a higher combustion temperature. The partial oxidation of the fuel results in the fuel mixture that includes carbon monoxide, water, hydrogen gas and methane. Excess heat from the partial oxidation reaction allows transfer of heat from first tube 108 to second tube 116. By burning the heavy portion at a temperature of above about 1,375° C., there is no significant formation of carbon soot or tar in the partial oxidation zone. If necessary, ignition can be with a hot surface igniter or a spark plug.

The light portion of the fuel is directed from light portion outlet 136 of fractionator 134 through light portion tube 142 to second tube 116. Steam is directed from steam source 126 through steam tube 128 to second tube inlet 118 into second tube 116. Also oxygen gas is directed from oxygen source 122 through oxygen tube 124 to second tube inlet 118 into second tube 116. In another embodiment, only steam is directed with a light portion of hydrocarbon fuel into second tube. A second mixture of oxygen-containing gas, a light portion of hydrocarbon fuel and steam is formed in second tube 116 annularly disposed about first tube 108. Hydrocarbon fuel of second mixture partially reacts to form a second heated reformate stream that includes hydrogen gas and carbon monoxide. In the presence of steam, second mixture partially steam reforms. The heat from the reaction in first tube 108 provides energy to help cause the reaction to progress in second tube 116.

The first heated reformate stream from first tube 108 and second heated reformate stream from second tube 116 are directed through first tube outlet 112 and second tube outlet 120, respectively, into mixing zone 114. The separate tubes allow carbon reduced operation at high fuel to oxygen ratios of about four to one. It also allows using distillate fuels, such as gasoline, diesel fuel, jet fuel or kerosene, whereby heavy portion type fuels are preferentially directed to first tube 108 for high-temperature combustion necessary to break heavy molecules while the light portion-type vapors are directed to second tube 116 for partial steam reforming as a result of thermal contact with combustion chamber. First heated reformate stream and second heated reformate stream mix within mixing zone 114. The mixture is directed from mixing zone 114 through catalyst reforming zone 144 to exit zone 146. In catalyst reforming zone 144, the remainder of the carbon monoxide is reformed to carbon dioxide to form product stream. The product stream exits through exit zone 146 and from second reformer 100 through reformer shell exit 152.

Figure 3:
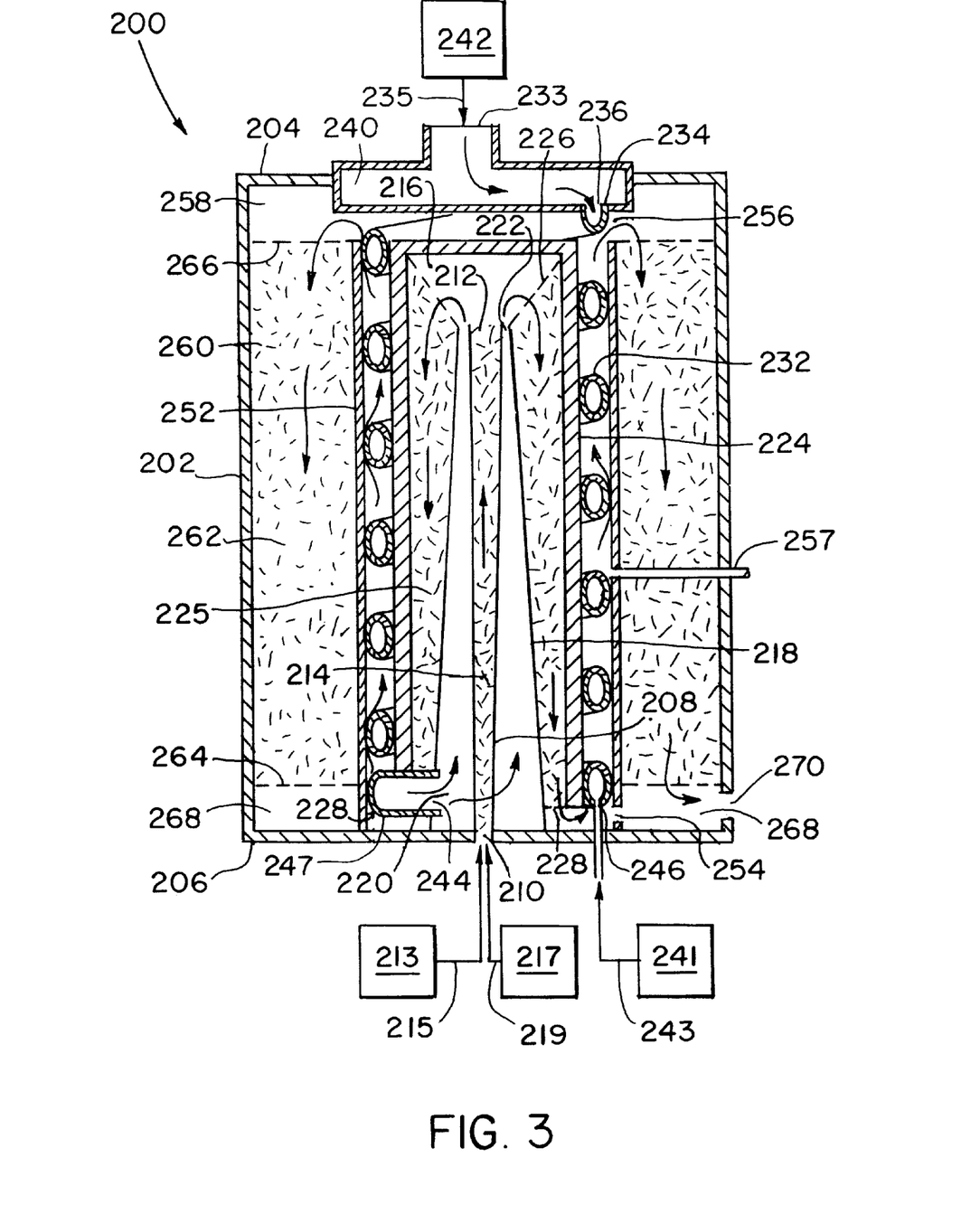
FIG. 3 is an orthogonal projection side view of a third embodiment of the apparatus of the present invention.

Another embodiment of the invention is shown in FIG. 3. Third reformer 200 has reformer shell 202. Reformer shell 202 has upper portion 204 and lower portion 206. Disposed in the center of reformer shell 202 is first tube 208. First tube 208 has a first tube inlet 210 at lower portion 206 for receiving gases into first tube 208. First tube 208 has first tube outlet 212 at upper portion 204 for gases to exit first tube 208. First tube 208 includes steam reforming catalyst 214 for reforming a hydrocarbon in the presence of steam.

An example of a suitable steam reforming catalyst is nickel with amounts of a noble metal such as cobalt, platinum, palladium, rhodium, ruthenium, iridium, and a support such as magnesia, magnesium aluminate, alumina, silica, zirconia, singly or in combination. Alternatively, steam reforming catalyst can be a single metal, such as nickel, supported on a refractory carrier like magnesia, magnesium aluminate, alumina, silica, or zirconia, singly or in combination, promoted by an alkali metal like potassium. First tube 208 is configured for receiving a mixture of steam and a first hydrocarbon or alcohol fuel. First tube outlet 212 is configured for directing a first reaction reformate of the first mixture to mixing zone 216. First tube 208 can be uniform in diameter, or alternatively, the tube can be tapered such as having a smaller diameter at first tube inlet 210 than the diameter at first tube outlet 212.

Steam source 213 is connected to first tube 208 by steam tube 215. Steam source 213 can provide a source of steam at a temperature of about 150° C. and a pressure of about 60 psia. Light fuel source 217 is connected by light fuel tube 219 to first tube 208 for directing light fuel into first tube 208. Light fuel includes a suitable fuel such as a hydrocarbon, including gasoline, JP-8, kerosene, also alcohol including methanol and ethanol.

Second tube 218 is annularly disposed about first tube 208. Second tube 218 has second tube inlet 220 for receiving a mixture of oxygen and heavy hydrocarbon fuel. Second tube 218 also has second tube outlet 222 for directing a second reaction reformate of a second mixture. Second tube 218 can have a uniform diameter length of second tube 218, or alternatively second tube 218 can be tapered, such as having a larger diameter at lower portion 206 and narrower diameter at upper portion 204. Second tube outlet 222 is configured for directing a second reaction reformate of the second mixture to mixing zone 216.

Annularly disposed about second tube is third tube 224. Third tube 224 has third tube inlet 226 proximate to mixing zone 216 for receiving a mixture of first reaction reformate of the first mixture and second reaction reformate of the second mixture. Third tube 224 has third tube outlet 228 for directing mixture of first reaction reformate and second reaction reformate from third tube 224. Third tube 224 can include steam reforming catalyst 225 for further reforming the hydrocarbon present in the mixture. An example of a suitable steam reforming catalyst includes the same catalyst described for steam reforming catalyst 214.

Helical tube 232 extends about the length of third tube 224. First end 234 of helical tube 232 is located at inlet housing 233. Oxygen source 242 is connected to inlet housing 233 by conduit 235 with first end inlet 236 for receiving oxygen-containing gas from oxygen gas zone 240. Second end 247 of helical tube 232 has helical tube outlet 244 for directing oxygen-containing gas into second tube 218. Examples of suitable oxygen-containing gas include oxygen ($O_2$), air, etc.

Heavy fuel source 241 is connected by heavy fuel tube 243 to heavy fuel inlet 246. Heavy fuel inlet 246 is joined to helical tube 232 proximate to second end 247. Examples of suitable heavy fuels include gasoline, kerosene, JP-8, methanol and ethanol. In another embodiment, the same sources of fuel can be used for heavy fuel (first hydrocarbon fuel) and light fuel (second hydrocarbon fuel). Alternatively, a fractionator, as described in FIG. 2, can be used to supply a heavy fuel and a light fuel. In another embodiment, the light fuel and heavy fuel can be the same and can come from the same source.

Vessel 252 is annularly disposed about third tube 224. Vessel inlet 254 can direct reformate products from third tube outlet 228 into vessel 252. Helical tube 232 is disposed between vessel 252 and third tube 224 and gases from third tube 224 can be directed through vessel 252 from vessel inlet 254 over and around helical tube 232 to vessel outlet 256. Flow distribution region 258 conducts gas from vessel outlet 256 to catalyst reforming zone 260. Additional steam can be added through second steam inlet 257 to provide added cooling and water for reforming.

Catalyst reforming zone 260 is annularly disposed about vessel 252. Catalyst reforming zone 260 includes catalyst 262 for further shifting the reformate to hydrogen gas. An example of a suitable catalyst includes ferric oxide ($Fe_2O_3$) and chromic oxide ($Cr_2O_3$) Other types of high temperature shift catalysts include iron oxide and chromium oxide promoted with copper, iron silicide, supported platinum, supported palladium, and other supported platinum group metals, singly and in combination. The catalyst can be in powdered form and have a height substantially the height of vessel 252. Catalyst reforming zone 260 is sufficiently porous to allow passage of gas from flow distribution region 258 to exit zone 268. Catalyst 262 in catalyst reforming zone 260 is held in place by lower perforated plate 264 and upper perforated plate 266. Product gases of catalyst reforming zone 260 can exit third reformer 200 from exit zone 268 through reformer shell exit 270.

In a third embodiment of the invention for converting hydrocarbon or alcohol fuel into hydrogen gas and carbon dioxide, a fuel is directed from light fuel source 217 through light fuel tube 219 to first tube inlet 210. Steam is directed from steam source 213 through steam tube 215 to tube inlet 210 into tube 208. Light fuel partially reacts with the steam to form a first heated reformate stream that includes hydrogen gas and carbon monoxide. First heated reformate stream is directed from first tube 208 through first tube outlet 212 to mixing zone 216.

An oxygen containing gas, such as air, is directed from oxygen source 242 through conduit 235 to inlet housing 233 to oxygen gas zone 240 into first end inlet 236 of helical tube 232. The oxygen containing gas, such as air, is preheated to a temperature of about 450° C. In a preferred embodiment, the air has a velocity of greater than about 40 meters per second. As oxygen containing gas is directed through helical tube 232, a suitable heavy fuel vapor is directed from heavy fuel source 241 through heavy fuel tube 243. Examples of suitable heavy fuels include JP-8, kerosene and other hydrocarbon fuels typically used in reformers. Gaseous hydrocarbons, such as methane and propane, can also be used. The oxygen-containing gas and heavy fuel are fed at rates sufficient to mix within helical tube 232 and spontaneously partially oxidize as the mixture enters second tube 218 through second tube inlet 220 to form a heated second reformate stream that includes steam, carbon monoxide and oxygen gas. In a preferred embodiment, oxygen-containing gas is tangentially directed around the interior of second tube 218. A hydrocarbon fuel of second mixture partially reacts to form a second heated reformate stream that includes hydrogen gas and carbon monoxide. The heat in second tube 218 provides energy to cause the reaction to progress in first tube 208.

The fuel that is fed into first tube 208 and second tube 218 may or may not be about equal in amount. Second tube 218, the partial oxidation chamber, is operated at a ratio of about two to one, fuel to oxygen gas, for example, with a temperature of about 1375° C. Heat transfer from second tube 218 to first tube 208 can cause partial steam reforming in first tube 208 while the temperature is maintained at about 925° C. For liquid fuels, such as gasoline and light kerosene, the lighter fuel ends are prevaporized for delivery to first tube 208. Heavy fuels are burned in the partial oxidation zone where high temperature (about 1375° C.) can break down fuel with minimal carbonization.

The first heated reformate stream from first tube 208 and second heated reformate stream from second tube 218 are directed to first tube outlet 212 and second tube outlet 222, respectively, into mixing zone 216. The separate tubes allow carbon reduced operation at high fuel to oxygen ratios of about four or five to one, thereby reducing soot formation. It allows using distillate fuels, such as gasoline or kerosene, whereby heavy portion type fuels are preferentially directed to second tube 218 for high temperature combustion necessary to break heavy molecules while a light portion-type vapors are directed to first tube 208 for partial steam reforming as a result of thermal contact with the heated combustion from second tube 218. First heated reformate stream and second heated reformate stream mix within mixing zone 216. The mixture is directed from mixing zone 216 through third tube inlet 226 into third tube 224.

In third tube 224, a further portion of the fuel is reformed to hydrogen and carbon monoxide to form third tube reformate stream. Third tube reformate stream exits through third tube outlet 228. Third tube reformate products are directed through vessel inlet 254 into vessel 252 where the reformate stream passes over and around helical tube 232 to vessel outlet 256. Additional steam can be added to vessel 252 through steam inlet 253 to provide additional cooling and further reform the hydrocarbon and carbon monoxide present in the reformate stream. The reformate stream is directed from flow distribution region 258 through catalyst reforming zone 260 where reformate stream is directed through catalyst reforming zone for further reforming the carbon monoxide into hydrogen gas and carbon dioxide to form product stream having a concentration of about 0.5 percent, by volume, carbon monoxide. The product stream exits through exit zone 268 through shell exit 270.

Equivalents

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A reformer for converting a hydrocarbon fuel into hydrogen gas and carbon dioxide comprising:
    a first vessel having an inner wall which defines:
        a first portion defining a partial oxidation reaction zone;
        a second portion disposed downstream of the first portion defining a steam reforming reaction zone; and,
        a perforated barrier interposed between the first and second portions;
    means for igniting a reactant mixture including oxygen-containing gas and unburned fuel;
    a first vessel inlet configured to direct the reactant mixture into the first portion substantially tangential to the inner wall of the first vessel;
    a first vessel outlet communicating with the second portion of the first vessel and disposed downstream of the first portion;
    a helical tube disposed about the first vessel and having:
        a first end for connection to an oxygen source supplying oxygen-containing gas to the reactant mixture;
        a second end for connection to the first vessel inlet, the helical tube configured to conduct the oxygen-containing gas from the oxygen source to the first vessel; and,
        wherein the helical tube is further connected to an unburned fuel source and is configured to permit fuel from the fuel source to mix with the oxygen-containing gas within the helical tube;
    a second vessel having a second vessel inlet and a second vessel outlet, the second vessel annularly disposed about the first vessel and configured to direct product gases from the first vessel through the second vessel, wherein the helical tube is interposed between the first vessel and the second vessel;
    a third vessel annularly disposed about the second vessel, the third vessel having:
        a third vessel inlet for directing product gases from the second vessel;
        a third vessel outlet;
        a cooling zone; and,
        a high-temperature shift reaction zone disposed upstream of the cooling zone; and,
    a cooling tube having:
        a cooling tube inlet configured for communication with a cooling medium source; and,
        a cooling tube outlet, wherein a portion of the cooling tube is disposed within the cooling zone.

2. The reformer of claim 1 wherein the partial oxidation reaction zone is configured to redirect the tangential stream to flow there through in a generally helical manner.

3. The reformer of claim 1 wherein the oxygen source is adapted to supply air.

4. The reformer of claim 1 wherein the helical tube is connected to a steam source and is configured to direct a supply of steam from the steam source to mix with the fuel and the oxygen-containing gas within the helical tube.

5. The reformer of claim 1 wherein said steam reforming reaction zone includes a first catalyst.

6. The reformer of claim 5 wherein the first catalyst includes nickel.

7. The reformer of claim 1 wherein the third vessel has a high-temperature shift reaction zone including a second catalyst.

8. The reformer of claim 7 wherein the second catalyst includes iron oxide.

9. The reformer of claim 1 wherein the third vessel has a low-temperature shift reaction zone including a third catalyst and is disposed downstream of the cooling zone.

10. The reformer of claim 9 wherein the third catalyst includes copper.

11. The reformer of claim 1 wherein the first portion is an open interior space without any catalyst.

12. The reformer of claim 1 further comprising a conduit communicating with a water source and the second vessel and adapted to direct a supply of water to the second vessel.

13. The reformer of claim 1 wherein the cooling zone includes a plurality of vertical fins radially extending between an inner wall and an outer wall of the third vessel.

14. The reformer of claim 1 wherein the cooling medium source is adapted to direct a liquid-phase heat transfer medium into the cooling tube to maintain a two-phase mixture throughout substantially an entire length of the cooling tube disposed within the cooling zone.

15. The reformer of claim 1 wherein the cooling tube is helically disposed within the cooling zone.

16. The reformer of claim 9 wherein the third vessel includes a high-temperature shift reaction zone disposed upstream of the cooling zone.

17. The reformer of claim 1 wherein the source of oxygen-containing gas and the source of unburned fuel are in fluid communication with the first vessel inlet.

18. The reformer of claim 17 wherein the source of oxygen-containing gas includes a conduit connecting the source to the first vessel inlet.

19. The reformer of claim 17 wherein the source of unburned fuel includes a conduit connecting the source to the first vessel inlet.

20. The reformer of claim 18 wherein the source of unburned fuel includes a conduit connecting the source to the first vessel inlet.

21. The reformer of claim 20 wherein the conduit of the source of oxygen-containing gas and the conduit of the source of unburned fuel join a pre-mixing conduit which is in fluid communication with the first vessel.

22. The reformer of claim 20 wherein the conduit of the source of oxygen-containing gas and the conduit of the source of unburned fuel are coaxial.

23. The reformer of claim 21 wherein the conduit of the source of oxygen-containing gas and the conduit of the source of unburned fuel are coaxial.

24. The reformer of claim 1 wherein the cooling zone includes a plurality of vertical fins radially extending between an inner wall and an outer wall of the third vessel.

25. The reformer of claim 1 wherein the cooling medium source is adapted to direct a liquid-phase heat transfer medium into the cooling tube to maintain a two-phase mixture throughout substantially an entire length of the cooling tube disposed within the cooling zone.

* * * * *

UNITED STATES PATENT AND TRADEMARK OFFICE
Certificate

Patent No. 6,126,908            Patented: October 3, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Lawrence G. Clawson, Dover, MA; William L. Mitchell, Belmont, MA; Jeffrey M. Bentley, Westford, MA; Johannes H.J. Thijssen, Cambridge, MA; and Dr. Peter J. Loftus, Cambridge, MA.

Signed and Sealed this Second Day of April 2002.

STEVEN P. GRIFFIN
*Supervisory Patent Examiner*
Art Unit 1754